UNITED STATES PATENT OFFICE.

HENRY HOWARD, OF BROOKLINE, MASSACHUSETTS.

PROCESS OF MAKING PHENOLS.

1,245,343.      Specification of Letters Patent.      Patented Nov. 6, 1917.

No Drawing.      Application filed May 22, 1915. Serial No. 29,811.

*To all whom it may concern:*

Be it known that I, HENRY HOWARD, a citizen of the United States, residing at Brookline, in the county of Norfolk and State of Massachusetts, have invented certain new and useful Improvements in Processes of Making Phenols, of which the following is a specification.

According to a well-known process, phenols are prepared from the corresponding aromatic hydrocarbons, as phenol from benzol, by successively sulfonating the benzol in presence of an excess of sulfuric acid; and decomposing the sulfonate by means of a caustic alkali, such as sodium hydroxid, also used in excess. At the completion of this stage of the reaction, the phenol exists as sodium phenolate and is liberated by neutralizing the phenolate by any appropriate acid.

The decomposition of the sodium phenolate was formerly accomplished by mineral acids, such as hydrochloric or sulfuric acid, and later by carbon dioxid. The use of carbon dioxid has the advantage that the sodium is recovered in the form of carbonate, and can either be used as such or readily causticized.

In the decomposition of the phenolate by carbon dioxid, it has been found that in case the pure (undiluted) gas is used, the reaction is rather sluggish, although it is eventually completed with good yields of phenol. The undiluted gas is however relatively expensive. If, on the other hand, lime-kiln gases are employed in lieu of pure carbon dioxid, the reaction proceeds much more slowly, and there are material losses of phenol, which is swept away by the nitrogen with which the lime-kiln gas is diluted.

According to the present invention, the sodium phenolate prepared as usual by the caustic fusion of the sulfonic body, is decomposed by sodium bicarbonate, preferably employed in the proportions required to transform all of the sodium, whether present as phenolate or as caustic soda associated with the phenolate, into normal sodium carbonate. Under these conditions the reaction is very rapid and even practically instantaneous. The reaction will proceed at normal and higher temperatures, and is exothermic. 60° C. is a satisfactory operating temperature, although either higher or lower temperatures may be used. So far as I am aware there are no fixed upper or lower limits for the concentration of the phenolate solution, but a concentration in the neighborhood of 23° Baumé is satisfactory in practice. To avoid unnecessary dilution the bicarbonate may be added to such solutions in solid form, although this is of course not essential. Most of the phenol rises to the surface of the liquid and may be separated by decantation, the remainder being recovered from the carbonate solution in any appropriate way, as for instance by distillation, or by blowing steam through the liquid.

About one-half or somewhat less of the sodium carbonate solution produced as above is now treated in any suitable apparatus with the lime-kiln gas, and is thereby re-converted into sodium bicarbonate, which is used for the treatment of another batch of sodium phenolate. The remainder of the sodium carbonate solution is causticized by lime, and may be concentrated for re-use in the preparation of the phenolate, or applied to any other purpose.

Any carbonate having a higher percentage of carbon dioxid than the normal carbonate is to be regarded as an equivalent of bicarbonate for the purposes of the present invention.

While I have explained my process with specific reference to the preparation of phenol ($C_6H_5OH$) from benzol, it is to be understood that the invention is not restricted to this particular reaction, but is applicable to the production of phenols in general from the corresponding aromatic hydrocarbons.

I claim:—

1. The process of producing phenols from phenolates, consisting in decomposing the phenolate in aqueous solution by an alkali metal bicarbonate.

2. In a process of making phenols from the corresponding aromatic hydrocarbons, the step which consists in liberating phenol from an alkali metal phenolate by reacting thereon with an alkali metal bicarbonate.

3. In a process of making phenol from benzol, the step which consists in liberating the phenol from an alkali metal phenolate by reacting thereon with an alkali metal bicarbonate.

In testimony whereof I affix my signature in presence of two witnesses.

HENRY HOWARD.

Witnesses:
MAE V. O'BRIEN,
I. M. GRAHAM.